United States Patent
Ni et al.

(10) Patent No.: US 9,926,434 B2
(45) Date of Patent: Mar. 27, 2018

(54) FIRE-RESISTANT THERMOPLASTIC POLYURETHANE ELASTOMER COMPOSITION

(71) Applicant: ADEKA CORPORATION, Tokyo (JP)

(72) Inventors: Yang Ni, Saitama (JP); Tatsuya Shimizu, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/302,011

(22) PCT Filed: Feb. 18, 2015

(86) PCT No.: PCT/JP2015/054409
§ 371 (c)(1),
(2) Date: Oct. 5, 2016

(87) PCT Pub. No.: WO2015/162982
PCT Pub. Date: Oct. 29, 2015

(65) Prior Publication Data
US 2017/0121502 A1 May 4, 2017

(30) Foreign Application Priority Data
Apr. 25, 2014 (JP) .................................. 2014-091229

(51) Int. Cl.
*C08L 75/04* (2006.01)
*C08K 3/36* (2006.01)
(Continued)

(52) U.S. Cl.
CPC ............. *C08K 5/5205* (2013.01); *C08K 3/22* (2013.01); *C08K 3/36* (2013.01); *C08L 75/04* (2013.01); *C08K 2003/2296* (2013.01)

(58) Field of Classification Search
CPC .......... C08L 75/04; C08L 75/06; C08L 75/08; C08K 3/36; C08K 2003/2296; C08K 3/22
See application file for complete search history.

(56) References Cited

U.S. PATENT DOCUMENTS 4,599,375 A * 7/1986 Berte' ..................... C08K 13/02
524/100
6,710,108 B2 3/2004 Govaerts et al.
(Continued)

FOREIGN PATENT DOCUMENTS

CN 102303770 A 1/2012
CN 103333364 A 10/2013
(Continued)

OTHER PUBLICATIONS

Machine translated English language equivalent of JP 2009242803 (Oct. 2009, 22 pages).*
(Continued)

*Primary Examiner* — Brieann R Johnston
(74) *Attorney, Agent, or Firm* — Young & Thompson

(57) ABSTRACT

The flame-retardant thermoplastic polyurethane elastomer composition includes a thermoplastic polyurethane elastomer, (A) a (poly)phosphate compound represented by general formula (1), (B) a (poly)phosphate compound represented by general formula (3), and (C) silicon dioxide. The composition preferably contains (D) zinc oxide. Symbols n, $X^1$, and p in formula (1) and r, $Y^1$, and q in formula (3) are as defined in the description.

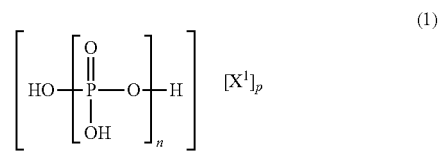

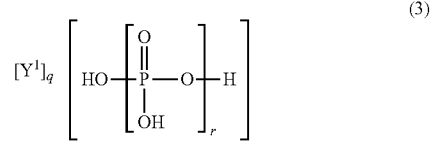

16 Claims, 1 Drawing Sheet

(51) Int. Cl.
*C08K 3/22* (2006.01)
*C08K 5/52* (2006.01)

(56) References Cited

U.S. PATENT DOCUMENTS

| | | |
|---|---|---|
| 7,147,506 B2 | 12/2006 | Malz et al. |
| 7,449,577 B2 * | 11/2008 | Kimura ............... C07D 295/02 544/337 |
| 7,829,614 B2 | 11/2010 | Ding et al. |
| 8,138,244 B2 | 3/2012 | Ding et al. |
| 8,212,073 B2 | 7/2012 | Kasowski |
| 8,691,897 B2 * | 4/2014 | Brown .................. C08K 5/521 524/115 |
| 9,336,927 B2 | 5/2016 | Sun et al. |
| 2003/0073763 A1 | 4/2003 | Govaerts et al. |
| 2003/0166812 A1 * | 9/2003 | Taniguchi ............... C08F 30/02 526/274 |
| 2005/0187320 A1 | 8/2005 | Malz et al. |
| 2005/0256234 A1 | 11/2005 | Kurumatani et al. |
| 2009/0048372 A1 | 2/2009 | Kasowski |
| 2010/0168289 A1 | 7/2010 | Ding et al. |
| 2010/0168290 A1 | 7/2010 | Ding et al. |
| 2011/0092622 A1 * | 4/2011 | Kaneda ............. C08K 5/34928 524/100 |
| 2011/0301279 A1 * | 12/2011 | Xue ....................... C09K 21/12 524/508 |
| 2012/0238664 A1 | 9/2012 | Yan et al. |
| 2013/0338248 A1 | 12/2013 | Bourbigot |
| 2015/0155075 A1 | 6/2015 | Sun et al. |

FOREIGN PATENT DOCUMENTS

| | | |
|---|---|---|
| JP | 09-221567 | 8/1997 |
| JP | 2001-049053 | 2/2001 |
| JP | 2005-501154 | 1/2005 |
| JP | 2005-533133 | 11/2005 |
| JP | 2007-514811 | 6/2007 |
| JP | 2009242803 A * | 10/2009 |
| JP | 2012-052092 | 3/2012 |
| JP | 2012-514112 | 6/2012 |
| JP | 2012-514113 | 6/2012 |
| JP | 2013-513668 | 4/2013 |
| JP | 2013-545858 | 12/2013 |
| WO | WO 2004/000973 | 12/2003 |
| WO | WO 2010/013400 | 2/2010 |

OTHER PUBLICATIONS

International Search Report, PCT/JP2015/054409, dated May 19, 2015.
Extended European Search Report (EESR) dated Oct. 25, 2017; Application No. 15782520.9.
Database WPI; Week 201230, Thomson Scientific, London, GB; AN 2012-600598 & CN 102 303 770A (Shanghai Yongli Belt Ind Co., Ltd); Jan. 4, 2012 (Jan. 4, 2012).
Database WPI; Week 201427; Thomson Scientific, London, GB; AN 2013-W87583 & CN 103 333 364A (Univ Qingdao Sci & Technology) Oct. 2, 2013 (Oct. 2, 2013).

* cited by examiner

FIRE-RESISTANT THERMOPLASTIC POLYURETHANE ELASTOMER COMPOSITION

TECHNICAL FIELD

This invention relates to a thermoplastic polyurethane elastomer composition having excellent flame retardancy with intact resin-specific physical properties.

BACKGROUND ART

Thermoplastic polyurethane (TPU) elastomers are composed of easily movable long-chain units called soft segments and extremely crystalline units called hard segments and exhibit excellent physical properties ascribed to their characteristic structure, such as elasticity, elongation, mechanical strength, and abrasion resistance. With these physical properties taken into advantage, they have been used in a variety of fields as, for example, hoses, belts, wires, cables, pipes, soles, automotive interior and exterior trim, and various moldings.

A flame retardant is blended with a TPU to impart flame retardancy to the TPU. The use of a halogen flame retardant has the problem of harmful gas generation on combustion. It is known to use instead a nitrogen- and/or phosphorus-containing compound, such as melamine phosphate, melamine polyphosphate, or a condensed phosphoric ester, as a halogen-free flame retardant (see patent document 1 below).

It is also proposed to use an intumescent phosphate flame retardant that induces formation of a swollen surface layer on combustion, which prevents diffusion of a decomposition product and heat transfer thereby to achieve flame retardation (see patent document 2 below).

However, the conventional phosphate-based flame retardants should be added in large quantities so as to obtain sufficient flame retardation, which can result in impairment of the physical properties intrinsic to the resin. The use of an anti-drip agent, such as polytetrafluoroethylene, which is added to prevent dripping, can also leads to the impairment of the physical properties intrinsic to the resin.

CITATION LIST

Patent Document

Patent document 1: JP 2001-49053A
patent document 2: WO 2010/013400

SUMMARY OF INVENTION

Technical Problem

An object of the invention is to provide a TPU elastomer with high flame retardancy and excellent physical properties intrinsic to the resin without using a halogen flame retardant that generates a harmful gas on combustion and a fluorine anti-drip agent.

Another object of the invention is to provide a molded article that has high flame retardancy and excellent physical properties intrinsic to the resin and gives off no harmful gas of halogen origin on combustion.

Solution to Problem

As a result of extensive investigations, the inventors have completed the present invention.

The invention provides a flame-retardant thermoplastic polyurethane elastomer composition comprising a thermoplastic polyurethane elastomer, (A) a (poly)phosphate compound represented by general formula (1) below, (B) a (poly)phosphate compound represented by general formula (3) below and (C) silicon dioxide.

[Chem. 1]

wherein n represents a number of 1 to 100; $X^1$ represents ammonia or a triazine derivative having general formula (2) below, and p represents a number satisfying the relation: $0 < p \leq n+2$;

[Chem. 2]

wherein $Z^1$ and $Z^2$, which may be the same or different, each represent a group selected from the group consisting of $-NR^5R^6$ (wherein $R^5$ and $R^6$, which may be the same or different, each represent a hydrogen atom, a straight or branched alkyl group having 1 to 6 carbon atoms, or a methylol group), a hydroxyl group, a mercapto group, a straight or branched alkyl group having 1 to 10 carbon atoms, a straight or branched alkoxy group having 1 to 10 carbon atoms, a phenyl group, and a vinyl group; and

[Chem. 3]

wherein r represents a number of 1 to 100; $Y^1$ represents a diamine represented by $R^1R^2N(CH_2)_mNR^3R^4$, piperazine, or a diamine having a piperazine ring, wherein $R^1$, $R^2$, $R^3$, and $R^4$, which may be the same or different, each represent a hydrogen atom or a straight or branched alkyl group having 1 to 5 carbon atoms; m represents an integer of 1 to 10; and q represents a number satisfying the relation: $0 < q \leq r+2$.

The flame-retardant TPU elastomer composition of the invention preferably contains (D) zinc oxide.

Component (A) of the flame-retardant TPU elastomer composition of the invention is preferably melamine pyrophosphate that is the compound of general formula (1) wherein n is 2, p is 2, and $X^1$ is melamine (i.e., the compound of general formula (2) in which $Z^1$ and $Z^2$ are each $-NH_2$).

Component (B) of the flame-retardant TPU elastomer composition of the invention is preferably a piperazine polyphosphate that is the compound of general formula (3) wherein q is 1, and $Y^1$ is piperazine.

The piperazine polyphosphate as component (B) of the flame-retardant TPU elastomer composition of the invention is preferably piperazine pyrophosphate.

The molded article of the invention is obtained from the flame-retardant TPU elastomer composition of the invention.

Effect of Invention

The invention provides a TPU elastomer with high flame retardancy and excellent physical properties intrinsic to the resin without using a halogen flame retardant that generates a harmful gas on combustion and a fluorine anti-drip agent. The invention also provides a molded article that exhibits high flame retardancy and excellent physical properties intrinsic to the resin and gives off no harmful gas of halogen origin on combustion.

DESCRIPTION OF EMBODIMENTS

The TPU elastomer that can be used in the flame-retardant TPU elastomer of the invention will be described first.

The TPU elastomer for use in the invention is generally prepared using a polyol, a diisocyanate, and a chain extender. Examples of the polyol include polyester polyols, polyester ether polyols, polycarbonate polyols, and polyether polyols.

Examples of the polyester polyols include those obtained by dehydration condensation between an aliphatic dicarboxylic acid (e.g., succinic acid, adipic acid, sebacic acid, or azelaic acid), an aromatic dicarboxylic acid (e.g., phthalic acid, terephthalic acid, isophthalic acid, or naphthalenedicarboxylic acid), an alicyclic dicarboxylic acid (e.g., hexahydrophthalic acid, hexahydroterephthalic acid, or hexahydroisophthalic acid), or an acidic ester or anhydride thereof and ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,3-octanediol, 1,9-nonanediol, or a like polyol, or a mixture of these polyols; and polylactone diols obtained by ring-open polymerization of a lactone monomer, such as ε-caprolactone.

Examples of the polyester ether polyols include those obtained by dehydration condensation between an aliphatic dicarboxylic acid (e.g., succinic acid, adipic acid, sebacic acid, or azelaic acid), an aromatic dicarboxylic acid (e.g., phthalic acid, terephthalic acid, isophthalic acid, or naphthalenedicarboxylic acid), an alicyclic dicarboxylic acid (e.g., hexahydrophthalic acid, hexahydroterephthalic acid, or hexahydroisophthalic acid), or an acidic ester or anhydride thereof and a glycol, such as diethylene glycol or a propylene oxide adduct, or a mixture of these glycols.

Examples of the polycarbonate polyols include those obtained by the reaction between at least one polyhydric alcohol (e.g., ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, or diethylene glycol) and diethylene carbonate, dimethyl carbonate, diethyl carbonate, or the like.

Copolymers of polycaprolactone polyol (PCL) and polyhexamethylene carbonate (PHL) are also useful.

Examples of the polyether polyols include polyethylene glycol, polypropylene glycol, and polytetramethylene ether glycol, which are each obtained by polymerization of a cyclic ether (e.g., ethylene oxide, propylene oxide, and tetrahydrofuran, respectively), and their copolyethers.

Examples of the diisocyanate include tolylene diisocyanate (TDI), 4,4'-diphenylmethane diisocyanate (MDI), 1,5-naphthalene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, methyloctane 1,8-diisocyanate, lysine ester triisocyanate, 1,3,6-hexamethylene triisocyanate, bicycloheptane triisocyanate, and dicyclohexylmethane diisocyanate (hydrogenated MDI, or HMDI). Preferred among them are 4,4'-diphenylmethane diisocyanate (MDI) and 1,6-hexamethylene diisocyanate (HDI).

A low molecular weight polyol may be used as the chain extender in the preparation of the TPU elastomer. Examples of the low molecular polyol include aliphatic polyols, such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexanedimethanol, and glycerol; and aromatic glycols, such as 1,4-dimethyrolbenzene, bisphenol A, and bisphenol A ethylene oxide or propylene oxide adducts.

TPU elastomer types include ester-based (lactone-based) polyurethane copolymers, ester-based (adipate-based) polyurethane copolymers, ether-based polyurethane copolymers, carbonate-based polyurethane copolymers, and ether/ester-based polyurethane copolymers. Examples of commercially available ester-based (lactone-based) polyurethane copolymers include Elastollan C80A10 (from BASF Japan), Elastollan C80A50 (from BASF Japan) and Resamine P-4000 and P-4500 series (from Dainichiseika Color & Chemicals Mfg. Co., Ltd.). Examples of commercially available ester-based (adipate-based) polyurethane copolymers include Pandex T-5000V (DIC Bayer Polymer Ltd.), Pandex TR-3080 (from DIC Bayer Polymer Ltd.), and Resamine P-1000 and P-7000 series (from Dainichiseika Color & Chemicals Mfg. Co., Ltd.). Examples of commercially available ether-based polyurethane copolymers include Elastollan 1180A50 (from BASF Japan Ltd.), Pandex T-8180 (from DIC Bayer Polymer Ltd.), Pandex T-8283 (from DIC Bayer Polymer Ltd.), Pandex T-1190 (from DIC Bayer Polymer Ltd.), and Resamine P-2000 series (from Dainichiseika Color & Chemicals Mfg. Co., Ltd.). Examples of commercially available carbonate-based polyurethane copolymers include Pandex T-7890N (from DIC Bayer Polymer Ltd.). Examples of commercially available ether/ester-based polyurethane copolymers include Desmopan DesKU2-88586 (from DIC Bayer Polymer Ltd.) and Resamine P-800 series (from Dainichiseika Color & Chemicals Mfg. Co.). These TPU elastomers can be used alone or in combination.

Component (A) in the invention will then be described.

The (poly)phosphate compound having general formula (1), which is used as component (A) in the invention, is a salt formed between a (poly)phosphoric acid and ammonia or a triazine derivative represented by general formula (2).

Examples of the straight or branched C1-C10 alkyl group as represented by $Z^1$ and $Z^2$ in formula (2) include methyl, ethyl, propyl, isopropyl, butyl s-butyl, t-butyl, isobutyl, amyl, isoamyl, t-amyl, hexyl, cyclohexyl, heptyl, isoheptyl, t-heptyl, n-octyl, isooctyl, t-octyl, 2-ethylhexyl, nonyl, and decyl. Examples of the straight or branched C1-C10 alkoxy group include those derived from the alkyl groups recited above. Examples of the straight or branched C1-C6 alkyl group as $R^5$ and $R^6$ of —$NR^5R^6$ represented by $Z^1$ and $Z^2$ include those having up to 6 carbon atoms out of the alkyl groups recited above.

Examples of the triazine derivative include melamine, acetoguanamine, benzoguanamine, acrylguanamine, 2,4-diamino-6-nonyl-1,3,5-triazine, 2,4-diamino-6-hydroxy-1,3,5-triazine, 2-amino-4,6-dihydroxy-1,3,5-triazine, 2,4-diamino-6-methoxy-1,3,5-triazine, 2,4-diamino-6-ethoxy-1,3,5-triazine, 2,4-diamino-6-propoxy-1,3,5-triazine, 2,4-diamino-6-isopropoxy-1,3,5-triazine, 2,4-diamino-6-mercapto-1,3,5-triazine, and 2-amino-4,6-dimercapto-1,3,5-triazine.

The (poly)phosphate compound of formula (1) which can preferably be used as component (A) is exemplified by a salt between a (poly)phosphoric acid and melamine or an ammonium polyphosphate compound.

Examples of the salt of (poly)phosphoric acid and melamine, which is preferably used, include melamine orthophosphate, melamine pyrophosphate, and melamine polyphosphate. Particularly preferred of them is melamine pyrophosphate having formula (1) wherein n is 2, p is 2, and $X^1$ is melamine. The salt between a phosphoric acid and melamine can be obtained by the following process. Melamine pyrophosphate, for example, can be obtained by causing sodium pyrophosphate and melamine to react with each other in any ratio in the presence of hydrochloric acid, followed by neutralization with sodium hydroxide.

The term "ammonium polyphosphate compound" is intended to encompass simple ammonium polyphosphate and a compound mainly comprising ammonium polyphosphate. As simple ammonium polyphosphate, commercially available products may be used, including Exolit 422 and Exolit 700 (both from Clariant Japan), Phos-Chek P/30 and Phos-Chek P/40 (both from Monsanto Co.), Sumisafe P (from Sumitomo Chemical Co., Ltd.), and Terraju S10 and S20 (both from Chisso Corp.).

Examples of the compound mainly comprising ammonium polyphosphate include ammonium polyphosphate coated or microencapsulated with a thermosetting resin, ammonium polyphosphate coated with a nitrogen-containing organic compound, such as a melamine monomer, ammonium polyphosphate treated with a surfactant or silicone, and sparingly soluble ammonium polyphosphate obtained by adding melamine to a system for the preparation of ammonium polyphosphate.

Examples of commercially available compounds mainly comprising ammonium polyphosphate include Exolit 462 from Clariant, Sumisafe PM from Sumitomo Chemical, and Terraju C60, C70, and C80 from Chisso.

Component (A) may be a mixture of two or more compounds.

Component (B) in the invention will next be described.

The (poly)phosphate compound having general formula (3), which is used as component (B) in the invention, is a salt formed between a (poly)phosphoric acid and a diamine represented by $Y^1$ (specifically, a diamine represented by $[R^1R^2N(CH_2)_mNR^3R^4]$, piperazine, or a piperazine ring-containing diamine). The straight or branched C1-C5 alkyl group as represented by $R^1$, $R^2$, $R^3$, and $R^4$ is exemplified by those with 1 to 5 carbon atoms out of the alkyl groups recited above as $Z^1$ and $Z^2$.

Examples of the diamine as $Y^1$ in formula (3) include N,N,N',N'-tetramethyldiaminomethane, ethylenediamine, N,N'-dimethylethylenediamine, N,N'-diethylethylenediamine, N,N-dimethylethylenediamine, N,N-diethylethylenediamine, N,N,N',N'-tetramethylethylenediamine, N,N,N',N'-diethylethylenediamine, tetramethylenediamine, 1,2-propanediamine, 1,3-propanediamine, tetramethylenediamine, pentamethylenediamine, hexamethylenediamine, 1,7-diaminoheptane, 1,8-diaminooctane, 1,9-diaminononane, 1,10-diaminodecane, piperazine, trans-2,5-dimethylpiperazine, 1,4-bis(2-aminoethyl)piperazine, and 1,4-bis(3-aminopropyl)piperazine. Any commercially available product of these diamines may be used.

The (poly)phosphate compound of formula (3) which is preferably used as component (B) is exemplified by a salt between a (poly)phosphoric acid and piperazine. Examples of the salt between a (poly)phosphoric acid and piperazine include piperazine orthophosphate, piperazine pyrophosphate, and piperazine polyphosphate. Preferred of them are piperazine polyphosphates of formula (3) wherein q is 1 and $y^1$ is piperazine, particularly piperazine pyrophosphate. The salt between a (poly)phosphoric acid and piperazine can be obtained by the following method. Piperazine pyrophosphate, for example, can be obtained easily by causing piperazine and pyrophosphoric acid to react with each other in water or methanolic water and collecting a sparingly water-soluble precipitate. The piperazine polyphosphate for use in the invention may be a salt formed between piperazine and a polyphosphoric acid mixture containing orthophosphoric acid, pyrophosphoric acid, tripolyphosphoric acid, and other polyphosphoric acids. The composition of the starting polyphosphoric acid mixture is not particularly limited.

Component (B) may be a mixture of two or more compounds.

The amount of component (A) is preferably 5 to 60 parts, more preferably 10 to 30 parts, even more preferably 12 to 20 parts, by mass per 100 parts by mass of the TPU elastomer. The amount of component (B) is preferably 10 to 90 parts, more preferably 15 to 45 parts, even more preferably 18 to 30 parts, by mass per 100 parts by mass of the TPU elastomer.

In order to achieve high flame retardation without impairing the physical properties of the TPU elastomer, the sum of the amounts of components (A) and (B) is preferably 15 to 65 pans, more preferably 25 to 55 parts, even more preferably 30 to 50 parts, by mass per 100 parts by mass of the TPU elastomer. If the sum is less than 15 parts, the TPU elastomer composition may fail to exhibit sufficient flame retardancy. If the sum exceeds 65 parts, the physical properties intrinsic to the resin can reduce.

The compounding mass ratio of component (A) to component (B), (A)/(B), is preferably 20/80 to 50/50, more preferably 30/70 to 50/50.

Component (C) used in the invention will be described.

Component (C) used in the invention is silicon dioxide. When added, it is effective in preventing dripping.

Silicon dioxide may have any form, powdery or granular. The type of silicon dioxide is not particularly limited and may be either natural silica or synthetic silica; may be either crystalline silica or amorphous silica; may be any of dry silica, fumed silica, fused silica, and wet silica; and may have pores inside (silica with pores or porous silica) or be without pores (non-porous silica).

Silicon dioxide is preferably finely divided particles, and an average primary particle size thereof is preferably 0.005 to 30 μm, more preferably 0.1 to 10 μm, even more preferably 0.5 to 5 μm. Silica with an average primary particle size greater than 30 μm may reduce the physical properties inherent to the resin. The average primary particle size can be determined using, for example, a laser diffraction/scattering particle size distribution analyzer.

Silicon dioxide may be surface-treated with a silane coupling agent, a surface treating agent, or the like.

Useful commercially available silicon dioxide products include Aerosil from Nippon Aerosil Co., Ltd.; Reosil and Tokusil from Tokuyama Corp.; Carplex from Shionogi & Co., Ltd.; Sylicia from Fuji Silysia Chemical, Ltd.; and Mizukasil from Mizusawa Industrial Chemicals, Ltd.

The amount of silicon dioxide as component (C) is preferably 0.1 to 10.0 parts, more preferably 0.5 to 5.0 parts, even more preferably 1.5 to 3.0 parts, by mass per 100 parts by mass of the TPU elastomer. When the amount is less than 0.1 parts, silicon dioxide may fail to exhibit anti-dripping effect. When added in an amount more than 10.0 parts, silicon dioxide may reduce the physical properties of the resin.

It is preferred for the flame-retardant TPU elastomer composition of the invention to further contain (D) zinc oxide. Zinc oxide may be surface-treated. Commercially available zinc oxide products may be used, including JIS class 1 zinc oxide available from Mitsui Mining and Smelting Co. Ltd., partially coated zinc oxide available from Mitsui Mining and Smelting Co. Ltd., Nanofine 50 (ultrafine zinc oxide with average particle diameter of 0.02 μm) from Sakai Chemical Industries Ltd., and Nanofine K (ultrafine zinc oxide with average particle diameter of 0.02 μm coated with zinc silicate) from Sakai Chemical Industries Ltd.

The amount of zinc oxide as component (D) is preferably 0.1 to 10 parts, more preferably 0.5 to 5.0 parts, even more preferably 1.0 to 3.0 parts, by mass per 100 parts by mass of the TPU elastomer composition.

The flame-retardant TPU elastomer composition of the invention may further contain a silicone oil with a view to reducing secondary agglomeration and improving water resistance. Examples of suitable silicone oils include dimethyl silicone oil (polysiloxane having methyl as all the side groups and both end groups), methyl phenyl silicone oil (polysiloxane having phenyl as part of side groups), methyl hydrogen silicone oil (polysiloxane having hydrogen at part of side chains), and copolymers of these siloxanes. Modified silicone oils may be used, which are obtained by introducing an organic group to part of the side chains and/or ends of the polysiloxanes described above, such as amine-, epoxy-, alicyclic epoxy-, carboxyl-, carbinol-, mercapto-, polyether-, long chain alkyl-, fluoroalkyl-, higher fatty acid ester-, higher fatty acid amide-, silanol-, diol-, phenol- and/or aralkyl-modified silicone oils.

Examples of useful silicone oils include KF-96, KF-965, and KF-968, all from Shin-Etsu Chemical Co., Ltd. (as dimethyl silicone oil); KF-99 and KF-9901, both from Shin-Etsu Chemical, HMS-151, HMS-071, HMS-301, and DMS-H21, all from Gelest (as methyl hydrogen silicone oil or a silicone oil having a methyl hydrogen polysiloxane structure); KF-50, KF-53, KF-54, and KF-56, all from Shin-Etsu Chemical (as methyl phenyl silicone oil); X-22-343, X-22-2000, KF-101, KF-102, and KF-1001, all from Shin-Etsu Chemical (as epoxy-modified silicone oils); X-22-3701E from Shin-Etsu Chemical (as carboxyl-modified silicone oils); X-22-4039 and X-22-4015, both from Shin-Etsu Chemical (as carbinol-modified silicone oils); and KF-393 from Shin-Etsu Chemical (as amine-modified silicone oils).

The flame-retardant TPU elastomer composition of the invention may further contain a silane coupling agent. A silane coupling agent is a compound having an organic functional group and a hydrolysable group and is represented by, for example, general formula: $A\text{-}(CH_2)_k\text{-}Si(OR)_3$, wherein A is an organic functional group, k is a number of 1 to 3, and R is methyl or ethyl. The organic group as A may be epoxy, vinyl methacryl, amino, or mercapto. For use in the invention, a silane coupling agent having an epoxy group is preferred.

The flame-retardant TPU elastomer composition of the invention may further contain a polyhydric alcohol compound as a flame retardant aid. A polyhydric alcohol compound is a compound having a plurality of hydroxyl groups, such as pentaerythritol, dipentaerythritol, tripentaerythritol, polypentaerythritol, neopentyl glycol, trimethylolpropane, ditrimethylolpropane, 1,3,5-tris(2-hydroxyethyl) isocyanurate (THEIC), polyethylene glycol, glycerol, diglycerol, mannitol, maltitol, lactitol, sorbitol, erythritol, xylitol, xylose, sucrose, trehalose, inositol, fructose, maltose, and lactose. Preferred of them is at least one compound selected from the group consisting of pentaerythritol and pentaerythritol condensates, such as pentaerythritol, dipentaerythritol, tripentaerythritol, and polypentaerythritol, Dipentaerythritol and other pentaerythritol condensates are more preferred. Dipentaeryhthritol is most preferred. THEIC and sorbitol are also preferably used.

The pentaerythritol condensate may be a mixture of pentaerythritol and a pentaerythritol condensate, which will hereinafter be called a (poly)pentaerythritol mixture. When a degree of condensation of pentaerythritol is represented by "n", the (poly)pentaerythritol mixture is characterized by containing a total of 5% to 40% by mass of pentaerythritol (n=1) and its lower condensates (n=2 and 3) relative to the total amount of the (poly)pentaerythritol mixture. Note that the total amount of pentaerythritol (n=1), the lower pentaerythritol condensates (n=2 and 3), and higher pentaerythritol condensates (n≥4) is taken as 100 mass %.

The total content of pentaerythritol (n=1) and its lower condensates (n=2 and 3) is preferably 10 to 30 mass % relative to the total amount of the (poly)pentaerythritol mixture in view of flame retardancy. It is more preferred that the content of pentaerythritol (n=1) be 0 to 10 mass % and that the total content of pentaerythritol (n=1) and its lower condensates (n=2 and 3) be 5 to 30 mass %. It is even more preferred that the content of pentaerythritol (n=1) be 0 to 5 mass % and that the total content of pentaerythritol (n=1) and lower pentaerythritol condensates (n=2 and 3) be 10 to 30 mass %.

Pentaerythritol and its condensates include compounds represented by general formula (4):

[Chem. 4]

(4)

wherein t is an integer of 1 or greater.

The (poly)pentaerythritol mixture may contain a pentaerythritol condensate provided by forming an ether bond in the molecule of a pentaerythritol condensate having formula (4), a pentaerythritol condensate in which an intermediate methylol group(s) is/are ether-linked with other molecule(s), a pentaerythritol condensate in which molecules are linked in a mesh form, and/or a pentaerythritol condensate in which molecules are further linked to increase in size and form macrocyclic ether structures at various sites.

The (poly)pentaerythritol mixture is not particularly restricted and can be produced by any known method. For example, the (poly)pentaerythritol mixture can be prepared by subjecting pentaerythritol and/or a pentaerythritol condensate to a dehydration condensation reaction under heating either directly or in the presence of an appropriate catalyst and solvent.

Examples of the catalyst used for the preparation of the (poly)pentaerythritol mixture include inorganic acids and organic acids that are usually used in a dehydration condensation reaction of an alcohol. Examples of the inorganic acids include mineral acids, such as phosphoric acid and sulfuric acid; acidic salts of these mineral acids; and solid acid catalysts, such as clay minerals (e.g., montmorillonite), silica-alumina, and zeolite. Examples of the organic acids include formic acid and p-toluenesulfonic acid.

The amount of the catalyst to be used is not particularly limited. When a water-soluble acid catalyst is used, it can be used in an amount that maintains the pH of the reaction system during the reaction at lower than 7, preferably 5 or lower. When a solid acid catalyst is used, it is usually used in an amount of 0.1 to 100 mass % with respect to the amount of pentaerythritol.

Examples of the solvent used for the preparation of the (poly)pentaerythritol mixture include hydrocarbons, such as benzene, xylene, decalin and tetralin; ethers such as dioxane, tetrahydrofuran, ethyl ether, anisole, phenyl ether, diglyme, tetraglyme, and 18-crown-6; ketones, such as methyl acetate, ethyl butyrate, methyl benzoate, and γ-butyrolactone; N-substituted amides, such as N-methylpyrrolidin-one, N,N-dimethylacetamide, N-methylpiperidone, and hexamethylphosphoric triamide; tertiary amines, such as N,N-diethylaniline, N-methylmorpholine, pyridine, and quinoline; sulfones, such as sulfolane; sulfoxides, such as dimethyl sulfoxide; urea derivatives, such as 1,3-dimethyl-2-imidazolidinone; phosphine oxides, such as tributylphosphine oxide; and silicone oils. These solvents may be dehydrated or hydrous.

The reaction temperature of the dehydration condensation under heating in the preparation of the (poly)pentaerythritol mixture is usually about 100 to 280° C., more preferably 150 to 240° C. When the reaction temperature is lower than 100° C., the reaction progress may be slow, whereas when the reaction temperature is higher than 280° C., it may be difficult to control the condensation reaction.

The amount of the polyhydric alcohol if added, is preferably 0.01 to 10.0 parts by mass, more preferably 1.0 to 7.0 parts by mass, even more preferably 1.5 to 3.0 parts by mass, per 100 parts by mass of the TPU elastomer.

The flame retardant TPU elastomer composition of the invention may preferably contain a lubricant according to necessity. Examples of useful lubricants include pure hydrocarbon lubricants, such as liquid paraffins, natural paraffins, microwaxes, synthetic paraffins, low-molecular polyethylenes, and polyethylene waxes; halogenated hydrocarbon lubricants; fatty acid lubricants, such as higher fatty acids and oxy fatty acids; fatty acid amide lubricants, such as fatty acid amides and bis-fatty acid amides; ester lubricants, such as lower alcohol esters of fatty acids, polyhydric alcohol esters of fatty acids (e.g., glycerides), polyglycol esters of fatty acids, and fatty alcohol esters of fatty acids (ester waxes); metal soaps; fatty alcohols; polyhydric alcohols; polyglycols; polyglycerols; partial esters of fatty acids and polyhydric alcohols; partial esters of fatty acids and polyglycol or polyglycerol; silicone oils; and mineral oils.

The amount of the lubricant to be added is preferably 0.01 to 5 parts, more preferably 0.3 to 2 parts, by mass per 100 parts by mass of the TPU elastomer.

Where needed, the flame retardant TPU elastomer composition of the invention may contain one or more halogen-free organic or inorganic flame retardants or flame retardant aids in an amount that does not impair the effects of the invention. Examples of useful flame retardants and flame retardant aids include triazine ring-containing compounds, metal hydroxides, phosphoric ester flame retardants, condensed phosphoric ester flame retardants, phosphate flame retardants, inorganic phosphorus flame retardants, dialkyl phosphinates, silicone flame retardants, metal oxides, boric acid compounds, thermally expandable graphite, other inorganic flame retardant aids, and other organic flame retardants.

Examples of the triazine ring-containing compounds include melamine, ammeline, benzoguanamine, acetoguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxides include magnesium hydroxide, aluminum hydroxide, calcium hydroxide, barium hydroxide, zinc hydroxide and KISUMA 5A® (magnesium hydroxide available from Kyowa Chemical Industry Co., Ltd.).

Examples of the phosphoric ester flame retardants include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyldiphenyl phosphate, trixylenyl phosphate, octyldiphenyl phosphate, xylenyldiphenyl phosphate, trisisopropylphenyl phosphate, 2-ethylhexyldiphenyl phosphate, t-butylphenyldiphenyl phosphate, bis(t-butylphenyl) phenyl phosphate, tris(t-butylphenyl)phosphate, isopropylphenyldiphenyl phosphate, bis(isopropylphenyl) diphenyl phosphate, and tris(isopropylphenyl)phosphate.

Examples of the condensed phosphoric ester flame retardants include 1,3-phenylene bis(diphenyl phosphate), 1,3-phenylene bis(dixylenyl phosphate), and bisphenol A bis (diphenyl phosphate).

Examples of the inorganic phosphorus flame retardants include red phosphorus.

Examples of the dialkyl phosphinates include aluminum diethyl phosphinate and zinc diethyl phosphinate.

Examples of the other inorganic flame retardant aids include inorganic compounds, such as titanium oxide, aluminum oxide, magnesium oxide, and hydrotalcite; and their surface-treated products. Various commercially available products of these flame retardant aids may be used, including TIPAQUE R-680® (titanium oxide from Ishihara Sangyo Kaisha, Ltd.), KYOWA MAG 150® (magnesium oxide from Kyowa Chemical Industry Co., Ltd.), DHT-4A (hydrotalcite from Kyowa Chemical Industry Co., Ltd.), and ALCAMIZER 4® (zinc-modified hydrotalcite from Kyowa Chemical Industry Co., Ltd.).

If desired, the frame retardant TPU elastomer composition of the invention may contain a phenol antioxidant, a phosphorus antioxidant, a thioether antioxidant, an ultraviolet absorber, a hindered amine light stabilizer, an anti-deterioration agent, and so forth.

Examples of the phenol antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene bis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl (3,5-di-tert-butyl-4-hydroxyphenyl)propionate, tetrakis[3-(3,5-di-tert-butyl-4-hydroxyphenyl)propionic acid methyl]methane, thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl) propionyloxyethyl] isocyanurate, 3,9-bis[1,1-dimethyl-2-{(3-tert-butyl-4-hydroxy-5-methylphenyl) propionyloxy}ethyl]-2,4,8,10-tetraoxaspiro[5,5]undecane, and triethylene glycol bis[(3-tert-butyl-4-hydroxy-5-methylphenyl)propionate].

The phenol antioxidant is added in an amount of preferably 0.001 to 10 parts, more preferably 0.05 to 5 parts, by mass per 100 parts by mass of the TPU elastomer.

Examples of the phosphorus antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene 10-oxide, 2,2'-methylenebis (4,6-tert-butylphenyl)-2-ethylhexyl phosphite, 2,2'-methylenebis(4,6-tert-butylphenyl)octadecyl phosphite, 2,2'-ethylidenebis(4,6-di-tert-butylphenyl) fluorophosphite, tris(2-[(2,4,8,10-tetrakis-tert-butyldibenzo[d,f][1,3,2]dioxaphosphepin-6-yl)oxy]ethyl)amine, phosphite of 2-ethyl-2-butylpropylene glycol and 2,4,6-tri-tert-butylphenol, and tris(2,4-di-tert-butylphenyl) phosphite.

The amount of the phosphorus antioxidant to be added is preferably 0.001 to 10 parts, more preferably 0.05 to 5 parts, by mass 100 parts by mass of the TPU elastomer.

Examples of the thioether antioxidant include dialkyl thiodipropionates, such as dilauryl thiodipropionate, dimyristyl thiodipropionate, and distearyl thiodipropionate, and a pentaerythritol tetra(β-alkylthiopropionate).

The amount of the thioether antioxidant to be added is preferably 0.001 to 10 parts, more preferably 0.05 to 5 parts, by mass per 100 parts by mass of the TPU elastomer.

Examples of the UV absorber include 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl) benzotriazoles, such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylenebis(4-tert-octyl-6-(benzotriazolyl)phenol), 2-(2'-hydroxy-3'-tert-butyl-5'-carboxyphenyl)benzotriazole; benzoates, such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides, such as 2-ethyl-2'-ethoxyoxanilide and 2-ethoxy-4'-dodecyloxanilide; cyanoacrylates, such as ethyl α-cyano-β,β-diphenylacrylate and methyl 2-cyano-3-methyl-3-(p-methoxyphenyl)acrylate; and triaryl triazines, such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

The amount of the UV absorber to be added is preferably 0.001 to 30 parts, more preferably 0.05 to 10 parts, by mass per 100 parts by mass of the TPU elastomer.

Examples of the hindered amine light stabilizer include hindered amine compounds, such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-tetramethyl-4-piperidyl) sebacate, bis(1-oxtoxy-2,2,6,6-tetramethyl-4-piperidy) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)di(tridecyl) 1,2,3,4-butanetetracarboxylate, bis(1,2,2,6,6-pentamethyl-4-piperidyl)di (tridecyl) 1,2,3,4-butanetetracarboxylate, bis(1,2,2,4,4-pentamethyl-4-piperidyl) 2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino) hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl] aminoundecane, and 1,6,11-tris[2,4-bis(N-butyl-N-(1,2,2,6,6-pentamethyl-4-piperidyl)amino)-s-triazin-6-yl] aminoundecane.

The amount of the hindered amine light stabilizer to be added is preferably 0.001 to 30 parts, more preferably 0.05 to 10 parts, by mass per 100 parts by mass of the TPU elastomer.

Examples of the anti-deterioration agent include naphthylamines, diphenylamines, p-phenyldiamines, quinolines, hydroquinone derivatives, monophenols, thiobisphenols, hindered phenols, and phosphite esters. The amount of the anti-deterioration agent to be added is preferably 0.001 to 10 parts by mass, more preferably 0.05 to 5 parts by mass, per 100 parts by mass of the TPU elastomer.

The flame retardant TPU elastomer composition of the invention may optionally contain a reinforcing material in an amount that does not impair the effects of the invention. The reinforcing material may have a fibrous, plate-like, granular, or powder form as is usual for application to synthetic resins. Specific examples of useful reinforcing materials include inorganic fibrous reinforcing materials, such as glass fiber, asbestos fiber, carbon fiber, graphite fiber, metal fiber, potassium titanate whisker, aluminum borate whisker, magnesium whisker, silicon whisker, wollastonite, sepiolite, asbestos, slag fiber, zonolite, ellestadite, gypsum fiber, silica fiber, silica alumina fiber, zirconia fiber, boron nitride fiber, silicon nitride fiber, and boron fiber; organic fibrous reinforcing materials, such as polyester fiber, nylon fiber, acrylic fiber, regenerated cellulose fiber, acetate fiber, kenaf, ramie, cotton, jute, hemp, sisal, flax, linen, silk, Manila fiber, sugarcane, wooden pulp, waste paper, used paper, and wool; and plate-like or granular reinforcing materials, such as glass flake, non-swellable mica, graphite, metal foil, ceramic beads, clay, mica, sericite, zeolite, bentonite, dolomite, kaolin, silicic acid powder, feldspar powder, potassium titanate, shirasu balloon, calcium carbonate, magnesium carbonate, barium sulfate, calcium oxide, aluminum oxide, titanium oxide, aluminum silicate, gypsum, novaculite, dawsonite, and white clay. The reinforcing material may have been coated or sized with a thermoplastic resin, such as an ethylene-vinyl acetate copolymer, or a thermosetting resin, such as an epoxy resin, or may have been treated with a coupling agent, such as an aminosilane or an epoxysilane.

The flame retardant TPU elastomer composition of the invention may optionally contain a sheet silicate in an amount that does not affect the effects of the invention. Examples of suitable sheet silicates include smectite clay minerals, such as montmorillonite, saponite, hectorite, beidellite, stevensite, and nontronite, vermiculite, halloysite, swelling mica, and talk. The sheet silicate may have an organic cation, a quaternary ammonium cation, or a phosphonium cation pre-intercalated between the layers thereof.

The flame retardant TPU elastomer composition of the invention may optionally contain a crystal nucleating agent in an amount that does not affect the effects of the invention. Any crystal nucleating agents commonly employed for polymers may be used as appropriate. In the invention, either of an inorganic crystal nucleating agent and an organic crystal nucleating agent may be used.

Examples of the inorganic crystal nucleating agent include kaolinite, synthetic mica, clay, zeolite, graphite, carbon black, magnesium oxide, titanium oxide, calcium sulfide, boron nitride, calcium carbonate, barium sulfate, aluminum oxide, neodymium oxide, and metal salts of phenyl phosphonate and the like. The inorganic crystal nucleating agent may be modified with an organic substance so as to have improved dispersibility in the composition.

Examples of the organic nucleating agent include metal salts of organic carboxylic acids, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonic acid salts, such as sodium p-toluenesulfonate and sodium sulfoisophthalate; carboxylic amides, such as stearamide, ethylenebislauramide, palmitamide, hydroxystearamide, erucamide, and trimesic acid tris(tert-butyramide); benzylidenesorbitol and its derivatives; metal salts of phosphorus compounds, such as sodium 2,2'-methylenebis(4,6-di-tert-butylphenyl)phosphate; and sodium 2,2-methylbis(4,6-di-tert-butylphenyl).

The flame retardant TPU elastomer composition of the invention may optionally contain a plasticizer in an amount that the does not impair the effects of the invention. Any plasticizers that are commonly used for polymers may be used as appropriate, including polyester plasticizers, glycerol plasticizers, polycarboxylic ester plasticizers, polyalkylene glycol plasticizers, and epoxy plasticizers.

Examples of the polyester plasticizers include those formed of an acid component, such as adipic acid, sebacic acid, terephthalic acid, isophthalic acid, naphthalenedicarboxylic acid, diphenyldicarboxylic acid, or rosin, and a diol component, such as propylene glycol, 1,3-butanediol, 1,4-butanediol, 1,6-hexanediol, ethylene glycol, or diethylene glycol; and those composed of a hydroxycarboxylic acid, such as polycaprolactone. These polyesters may be terminated with a monofunctional carboxylic acid or a monofunctional alcohol, or may be terminated with an epoxy compound.

Examples of the glycerol plasticizers include glycerol monoacetomonolaurate, glycerol diacetomonolaurate, glycerol monoacetomonostearate, glycerol diacetomonooleate, and glycerol monoacetomonomontanate.

Examples of the polycarboxylic ester plasticizer include phthalates, such as dimethyl phthalate, diethyl phthalate, dibutyl phthalate, dioctyl phthalate, diheptyl phthalate, dibenzyl phthalate, and butyl benzyl phthalate; trimellitates, such as tributyl trimellitate, trioctyl trimellitate, and trihexyl trimellitate; adipates, such as diisodecyl adipate, n-octyl n-decyl adipate, methyl diglycol butyl diglycol adipate, benzyl methyl diglycol adipate, and benzyl butyl diglycol adipate; citrates, such as triethyl acetylcitrate and tributyl acetylcitrate; azelates, such as di-2-ethylhexyl azelate; and sebacates, such as dibutyl sebacate and di-2-ethylhexyl sebacate.

Examples of the polyalkylene glycol plasticizers include polyalkylene glycols, such as polyethylene glycol, polypropylene glycol, a poly(ethylene oxide-propylene oxide) block and/or random copolymer, polytetramethylene glycol, ethylene oxide addition polymers of bisphenols, propylene oxide addition polymers of bisphenols, and tetrahydrofuran addition polymers of bisphenols; and their end-blocked compounds, such as end epoxy-modified compounds, end ester-modified compounds, and end ether-modified compounds.

The term "epoxy plasticizer" generally refers to epoxy triglycerides composed of epoxy alkyl stearate and soy bean oil. What we call epoxy resins prepared mainly from bisphenol A and epichlorohydrin are also useful.

Examples of other useful plasticizers include benzoates of aliphatic polyols, such as neopentylglycol dibenzoate, diethylene glycol dibenzoate, and triethylene glycol di-2-ethylbutyrate; fatty acid amides, such as stearamide; aliphatic carboxylic esters, such as butyl oleate; oxyacid esters, such as methyl acetylricinolate and butyl acetylricinolate; pentaerythritol, sorbitols, polyacrylates, and paraffins. The above described plasticizers may be used either individually or in combination of two or more thereof.

The flame retardant TPU elastomer composition of the invention may optionally contain an acrylic processing aid in an amount that does not impair the effects of the invention. The acrylic processing aid is exemplified by a homopolymer of a (meth)acrylic ester or a copolymer of two or more of (meth)acrylic esters.

The flame retardant TPU elastomer composition of the invention may contain an anti-drip agent in an amount that does not adversely affect the effects of the invention. It should be noted, however, that it is not advisable to use a fluorine-containing anti-drip agent from the standpoint of freedom from halogen and also because the physical properties of the TPU elastomer, particularly elongation would be reduced. It is particularly unfavorable to use polytetrafluoroethylene.

Examples of the fluorine-containing anti-drip agent include fluorocarbon resins, such as polytetrafluoroethylene, polyvinylidene fluoride, and polyhexafluoropropylene, and alkali metal or alkaline earth metal salts of perfluoroalkanesulfonic acids, such as sodium perfluoromethanesulfonate, potassium perfluoro-n-butanesulfonate, potassium perfluoro-t-butanesulfonate, sodium perfluorooctanesulfonate, and calcium perfluoro-2-ethylhexanesulfonate.

If desired, the flame retardant TPU elastomer composition of the invention may contain additives commonly used for synthetic resins as long as the effects of the invention are not impaired. Useful additives include crosslinking agents, antistatics, metal soaps, fillers, antifogging agents, anti-plate-out agents, surface treating agents, fluorescent agents, antifungals, bactericides, foaming agents, metal inactivators, parting agents, pigments, processing aids, and so forth.

When the flame retardant TPU composition of the invention contains optional components other than the TPU and components (A) to (D) (exclusive of resins other than the TPU elastomer), the amounts of the optional components are not particularly limited as long as the effects of the invention are not impaired. However, it is preferred that the total amount of the optional components be not more than 100 parts, more preferably not more than 50 parts, by mass per 100 parts by mass of the TPU elastomer.

The flame retardant TPU elastomer composition of the invention may contain a synthetic resin other than the TPU elastomer as a resinous component. Useful synthetic resins include thermoplastic resins, including polyolefin and olefin copolymers, e.g., α-olefin polymers, such as polypropylene, high density polyethylene, low density polyethylene, linear low density polyethylene, crosslinked polyethylene, ultra-high molecular weight polyethylene, polybutene-1, and poly-3-methylpentene, ethylene-vinyl acetate copolymers, ethylene-ethyl acrylate copolymers, and ethylene-propylene copolymers; halogen-containing resins, such as polyvinyl chloride, polyvinylidene chloride, chlorinated polyethylene, chlorinated polypropylene, polyvinylidene fluoride, chlorinated rubber, vinyl chloride-vinyl acetate copolymers, vinyl chloride-ethylene copolymers, vinyl chloride-vinylidene chloride copolymers, vinyl chloride-vinylidene chloride-vinyl acetate terpolymers, vinyl chloride-acrylic ester copolymers, vinyl chloride-maleic ester copolymers, and vinyl chloride-cyclohexylmaleimide copolymers; petroleum resins, coumarone resins, polystyrene, polyvinyl acetate, acrylic resins, polymethyl methacrylate, polyvinyl alcohol, polyvinyl formal, polyvinyl butyral; aromatic polyester resins, including polyalkylene terephthalates, such as polyethylene terephthalate, polybutylene terephthalate, and polycyclohexanedimethylene terephthalate, polyalkylene naphthalates, such as polyethylene naphthalate and polybutylene naphthalate, and linear polyester resins, such as polytetramethylene terephthalate; degradable aliphatic polyesters, such as polyhydroxybutyrate, polycaprolactone, polybutylene succinate, polyethylene succinate, polylactic acid, polymalic acid, polyglycolic acid, polydioxane, and poly(2-oxetanone); polyamide resins, such as polyphenylene oxide, polycaprolactam, and polyhexamethylene adipamide; polycarbonate, branched polycarbonate, polyacetal, polyphenylene sulfide, polyurethane, cellulose resins; and polyblends of these thermoplastic resins. Further included in useful synthetic resins are thermosetting resins, such as phenol resins, urea resins, melamine resins, epoxy resins, and unsaturated polyester resins, fluororesins, silicone resins, silicone rubber polyether sulfone, polysulfone, polyphenylene ether, polyether ketone, polyether ether ketone, and liquid crystal polymers. Also useful are isoprene rubber, butadiene rubber, acrylonitrile-butadiene copolymer rubber, styrene-butadiene copolymer rubber, fluororubber, and silicone rubber. Additional examples of the synthetic resin include olefin thermoplastic elastomers, styrene thermoplastic elastomers, polyester thermoplastic elastomers, nitrile thermoplastic elastomers, nylon thermoplastic elastomers, vinyl chloride thermoplastic elastomers, and polyamide thermoplastic elastomers.

These synthetic resins may be used either individually or in combination of two or more thereof. They may be used in the form of polymer alloy.

The above described synthetic resins may be used irrespective of molecular weight, degree of polymerization, density, softening point, solvent-insoluble content, degree of stereoregularity, presence or absence of catalyst residue, type and compounding ratio of monomers, type of catalyst for polymerization (e.g., Ziegler type or metallocene type), and the like.

Preferred of these synthetic resins described are ethylene polymers, such as high density polyethylene (HDPE), low density polyethylene (LDPE), and linear low density polyethylene (LLDPE); and ethylene copolymers, such as ethylene-vinyl acetate copolymers, ethylene-ethyl acrylate copolymers, ethylene-methyl acrylate copolymers, ethylene-acrylic acid copolymers, and ethylene-methacrylic acid copolymers.

When in using resins other than the TPU elastomer, the amount of the other resins is not particularly limited, but it is preferably not more than 100 parts, more preferably not more than 50 parts, by mass per 100 parts by mass of the TPU elastomer.

In making the flame retardant TPU elastomer composition of the invention, the time to blend the TPU elastomer with the essential components (A), (B), and (C) and the optional component (D) is not particularly restricted. For instance, any two or more of components (A) to (D) may previously be mixed, and the resulting premix may be added to the TPU elastomer, or components (A) to (D) may separately be added to the TPU elastomer. In the former case, each component to be premixed may previously be ground, or grinding may follow the premixing. The same manner of blending described above applies to the resins other than the TPU elastomer and other optional components.

The flame retardant TPU elastomer composition of the invention can be molded to provide molded articles excellent in flame retardancy. The flame retardant TPU elastomer composition of the invention can be molded by any known molding techniques, such as extrusion, calendering, injection, rolling, compression, and blown-film extrusion, to provide articles of various forms, such as plates, sheets, films, or any other irregular shapes.

The flame retardant TPU elastomer composition of the invention and molded articles thereof find wide applications in various industrial fields, including electric & electronics, communications, agriculture, forestry, fisheries, mining, construction, foods, fibers, clothing, remedy, coal, petroleum, rubber, leather, automobiles, precision equipment, lumber, building materials, civil engineering, furniture, printing, musical instruments, and so on. Specifically, the applications include stationery and OA equipment, such as printers, personal computers, word processors, keyboards, PDAs (personal digital assistants), telephone sets, copiers, fax machines, ECRs (electronic cash registers), calculators, electronic diaries, cards, holders, and writing tools; household electric appliances, such as laundry machines, refrigerators, vacuum cleaners, microwave ovens, lighting equipment, game machines, irons, and kotatsu; audio and visual equipment, such as TV sets, VTRs, camcorders, radio-cassette recorders, tape recorders, mini discs, CD players, speakers, and liquid crystal displays; electric and electronic components, such as connectors, relays, capacitors, switches, printed circuit boards, coil bobbins, semiconductor sealants, LED sealants, electric wires, cables, transformers, deflection yokes, distribution boards, and clocks; housings (frames, cases, covers, and enclosures) and parts of communication equipment and OA equipment; and automotive interior and exterior parts.

The flame retardant TPU elastomer composition of the invention and its molded products are also useful in various applications, including materials for gas (petrol) vehicles, hybrid vehicles, electrical vehicles, train cars, boats, ships, aircrafts, buildings, and houses, such as seats (stuffing and upholstery), belts, ceiling covering, convertible tops, arm rests, door trims, rear package trays, rugs, mats, sun visors, wheel covers, mattress covers, air bags, insulating materials, assist grips, assist straps, wire covering, electrical insulators, paints, coatings, overlays, flooring, inside corner moldings, carpet, wallpaper, wall covering, exterior covering, interior covering, roofing, decks, walls, pillars, floor plates, fences, frames and moldings, profiles for windows and doors, roof shingles, siding boards, terraces, balconies, soundproofing boards, heat insulating boards, and window boards; civil engineering materials; and housewares and sporting equipment, such as clothing, curtains, bed sheets, chip boards, fiber boards, carpet and rugs, doormats, sheets, buckets, hoses, containers, glasses, bags, cases, goggles, skis, rackets, tents, and musical instruments.

EXAMPLES

The invention will now be illustrated in greater detail with reference to Examples, but the invention is not deemed to be limited thereto. Unless otherwise noted, all the parts are by mass, and the compounding ratios in Table 1 are given in terms of parts by mass.

Examples 1 to 5 and Comparative Examples 1 to 5

A hundred parts of a TPU elastomer (Resamine P-2283 from Dainichiseika Color & Chemicals Mfg. Co., Ltd.) were blended with 0.1 parts of calcium stearate as a lubricant, 0.1 parts of tetrakis[3-(3,5-di-t-butyl-4-hydroxyphenyl)methyl propionate]methane as a phenol antioxidant, 0.1 parts of tris(2,4-di-t-butylphenyl) phosphite as a phosphorous antioxidant, 0.3 parts of glycerol monostearate as a lubricant, and components shown in Table 1 below. The resulting blend was extruded at 200° C. to obtain pellets. The pellets were injection molded at 190° C. to make 127 mm long, 12.7 mm wide, and 1.6 mm thick specimens. In Example 1 and Comparative Example 1, 100 mm long, 100 mm wide, and 2 mm thick specimens were also prepared.

Components (A) and (B) shown in Table 1 were prepared as follows.

Preparation Example 1

Component (A): Melamine Pyrophosphate
Melamine pyrophosphate was prepared by the reaction between pyrophosphoric acid and melamine in a molar ratio of 1:2.

Preparation Example 2

Component (B): Piperazine Pyrophosphate
Piperazine pyrophosphate was prepared by the reaction between pyrophosphoric acid and piperazine in a molar ratio of 1:1.

The specimens prepared in Examples 1 to 5 and Comparative Examples 1 to 5 were evaluated for flame retardancy by the UL-94 test in accordance with the procedure described below. The results obtained are shown in Table 1.

UL-94 Flammability Test Method:
Each specimen (127 mm long, 12.7 mm wide, 1.6 mm thick) was held with long axis vertical. A flame of a burner was applied to the lower end of the specimen for 10 seconds and removed, and the flame duration was recorded. As soon as the specimen stopped burning, the flame was reapplied for an additional 10 seconds, and the flame duration was measured in the same manner as in the first flame application. Ignition of the cotton layer placed below the specimen by any drips of flaming particles was also observed.

The flame duration after each flame application and the ignition of the cotton layer were interpreted into a UL-94 flammability rating. The V-0 rating is the lowest flammability. The V-1 rating is less flame retardancy, and V-2 rating is still less flame retardancy. A specimen whose test results were not interpreted into any of these ratings was rated "NR".

The 100 mm long, 100 mm wide, and 2 mm thick specimens prepared in Example 1 and Comparative Example 1 were tested using a cone calorimeter (CONE III, from Toyo Seiki Co., Ltd.) in accordance with ISO5660 to measure heat release rate (HRR) at the radiant flux described below. Total heat released (THR) (MJ/m$^2$), peak heat release rate (PHRR)(kW/m$^2$), and duration of PHRR (sec) are shown in Table 1 (radiant flux: 50 kW/m$^2$).

Figure 1:
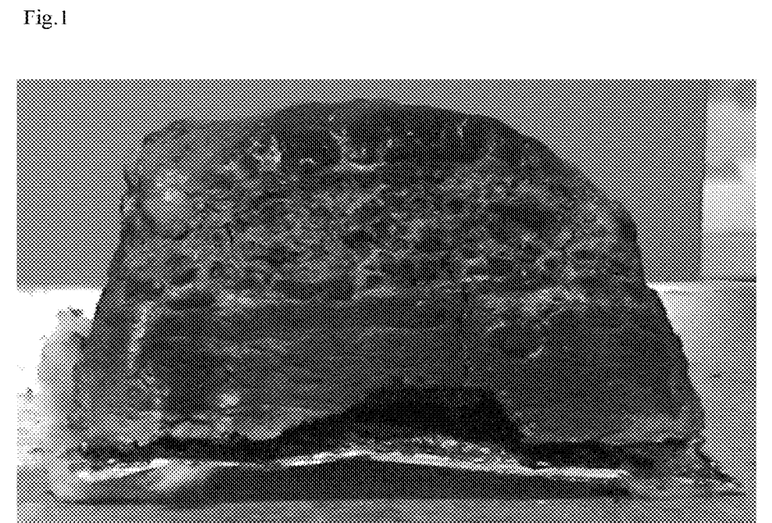
FIG. 1 is a photograph displaying a swollen surface layer of the test specimen obtained in Example 1.
Figure 2:
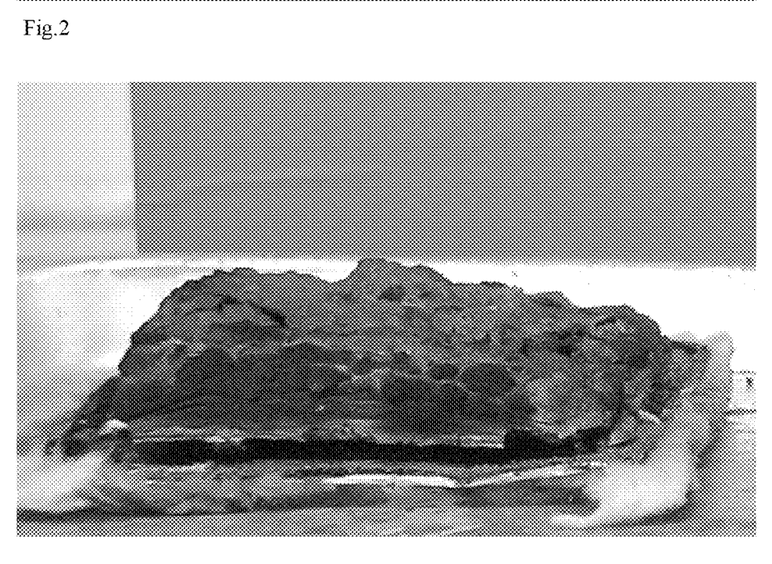
FIG. 2 is a photograph displaying a swollen surface layer of the test specimen obtained in Comparative Example 1.

After the cone test, the specimens were photographed to see the formation of a swollen surface layer. The maximum thickness of the swollen surface layer was measured. The photographs of the specimens of Example 1 and Comparative Example 1 are shown in FIGS. 1 and 2, respectively. The maximum thickness of the swollen surface layer is shown in Table 1.

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Composition: | | | | | | | | | | |
| TPU elastomer | 100 | 100 | 100 | 100 | 100 | 100 | 100 | 100 | 100 | 100 |
| (A) Melamine pyrophosphate | 14 | 12 | 18 | 14 | 14 | 14 | 12 | 18 | 14 | 18 |
| (B) Piperazine pyrophosphate | 21 | 18 | 27 | 21 | 21 | 21 | 18 | 27 | 21 | 27 |
| (C) Silicon dioxide* | 2.0 | 1.7 | 2.6 | 1.5 | 3.0 | — | — | — | — | — |

TABLE 1-continued

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| (D) Zinc oxide | 1.75 | 1.5 | 2.25 | 1.75 | 1.75 | 1.75 | 1.5 | 2.25 | 3.75 | 4.85 |
| Calcium stearate | 0.1 | 0.1 | 0.1 | 0.1 | 0.1 | 0.1 | 0.1 | 0.1 | 0.1 | 0.1 |
| Phenol antioxidant | 0.1 | 0.1 | 0.1 | 0.1 | 0.1 | 0.1 | 0.1 | 0.1 | 0.1 | 0.1 |
| Phosphorus antioxidant | 0.1 | 0.1 | 0.1 | 0.1 | 0.1 | 0.1 | 0.1 | 0.1 | 0.1 | 0.1 |
| Glycerol monostearate | 0.3 | 0.3 | 0.3 | 0.3 | 0.3 | 0.3 | 0.3 | 0.3 | 0.3 | 0.3 |
| Evaluation: | | | | | | | | | | |
| Flammability UL-94 (1.6 mm) | V-0 | V-0 | V-0 | V-0 | V-0 | V-2 | V-2 | V-2 | V-2 | V-2 |
| THR (MJ/m$^2$) | 27 | — | — | — | — | 40 | — | — | — | — |
| PHRR (kW/m$^2$) | 214 | — | — | — | — | 277 | — | — | — | — |
| Duration of PHRR (sec) | 1 | — | — | — | — | 1 | — | — | — | — |
| Max. thickness of swollen surface layer (mm) | 50 | — | — | — | — | 20 | — | — | — | — |

*Sylicia 436 (average primary particle size: 3.4 μm; from Fuji Silysia Chemical, Ltd.)

As can be seen from Table 1, all the specimens of Examples 1 through 5 were rated V-0 in the UL94 flammability test. In contrast, the specimens of Comparative Examples 1 through 5 dripped flaming particles that ignited the cotton and were rated V-2. The specimen of Example 1 was superior to that of Comparative Example 1 in flame retardancy in terms of total heat released and peak heat release rate.

As shown in Table 1 and FIG. 1, the specimen of Example 1 formed a sufficient swollen surface layer, proving capable of retarding diffusion of a decomposition product and heat transfer. In contrast, as shown in Table 1 and FIG. 2, the formation of a swollen surface layer is insufficient in Comparative Example 1, proving inferior in retarding diffusion of a decomposition product and heat transfer.

The invention claimed is:

1. A flame-retardant thermoplastic polyurethane elastomer composition comprising
a thermoplastic polyurethane (TPU) elastomer,
(A) a (poly)phosphate compound represented by general formula (1):

(1)

wherein n represents a number of 1 to 100;
$X^1$ represents ammonia or a triazine derivative having general formula (2):

(2)

wherein $Z^1$ and $Z^2$, which may be the same or different, each represent a group selected from the group consisting of —$NR^5R^6$, (wherein $R^5$ and $R^6$, which may be the same or different, each represent a hydrogen atom, a straight or branched alkyl group having 1 to 6 carbon atoms, or a methylol group), a hydroxyl group, a mercapto group, a straight or branched alkyl group having 1 to 10 carbon atoms, a straight or branched alkoxy group having 1 to 10 carbon atoms, a phenyl group, and a vinyl group;
and p represents a number satisfying the relation: 0<p≤n+2,
in an amount of 5 to 60 parts by mass per 100 parts by mass of the TPU elastomer;
(B) a (poly)phosphate compound represented by general formula (3):

(3)

wherein r represents a number of 1 to 100;
$Y^1$ represents a diamine represented by $R^1R^2N(CH_2)_mNR^3R^4$, piperazine, or a diamine having a piperazine ring, wherein $R^1$, $R^2$, $R^3$, and $R^4$, which may be the same or different, each represent a hydrogen atom or a straight or branched alkyl group having 1 to 5 carbon atoms; m represents an integer of 1 to 10; and q represents a number satisfying the relation:

0<q≤r+2, in an amount of 10 to 90 parts by mass per 100 parts by mass of the TPU elastomer;
(C) silicon dioxide in an amount of 1.5 to 10.0 parts by mass per 100 parts by mass of the TPU elastomer; and
(D) zinc oxide, in an amount of 0.1 to 10 parts by mass per 100 parts by mass of the composition.

2. The flame-retardant thermoplastic polyurethane elastomer composition according to claim 1, wherein component (A) is melamine pyrophosphate represented by general formula (1) wherein n is 2, p is 2, and $X^1$ is melamine that is a compound having general formula (2) wherein $Z^1$ and $Z^2$ are each —$NH_2$.

3. The flame-retardant thermoplastic polyurethane elastomer composition according to claim 1, wherein component (B) is a piperazine polyphosphate represented by general formula (3) wherein q is 1, and $Y^1$ is piperazine.

4. The flame-retardant thermoplastic polyurethane elastomer composition according to claim 3, wherein the piperazine polyphosphate is piperazine pyrophosphate.

5. A molded article obtained from the flame-retardant thermoplastic polyurethane elastomer composition according to claim 1.

6. The flame-retardant thermoplastic polyurethane elastomer composition according to claim 2, wherein component (B) is a piperazine polyphosphate represented by general formula (3) wherein q is 1, and $Y^1$ is piperazine.

7. A molded article obtained from the flame-retardant thermoplastic polyurethane elastomer composition according to claim 2.

8. A molded article obtained from the flame-retardant thermoplastic polyurethane elastomer composition according to claim 3.

9. A molded article obtained from the flame-retardant thermoplastic polyurethane elastomer composition according to claim 4.

10. A molded article obtained from the flame-retardant thermoplastic polyurethane elastomer composition according to claim 6.

11. The flame-retardant thermoplastic polyurethane elastomer composition according to claim 1, wherein
component (A) is present in an amount of 12 to 20 parts by mass per 100 parts by mass of the TPU elastomer;
component (B) is present in an amount of 18 to 30 parts by mass per 100 parts by mass of the TPU elastomer;
component (C) is present in an amount of 1.5 to 3.0 parts by mass per 100 parts by mass of the TPU elastomer; and
component (D) is present in an amount of 1 to 3 parts by mass per 100 parts by mass of the composition.

12. The flame-retardant thermoplastic polyurethane elastomer composition according to claim 1, wherein the sum of components (A) and (B) is 15 to 65 parts by mass per 100 parts by mass of the TPU elastomer.

13. The flame-retardant thermoplastic polyurethane elastomer composition according to claim 1, wherein the sum of components (A) and (B) is 30 to 50 parts by mass per 100 parts by mass of the TPU elastomer.

14. The flame-retardant thermoplastic polyurethane elastomer composition according to claim 1, wherein the mass ratio of component (A) to component (B) is 20/80 to 50/50.

15. The flame-retardant thermoplastic polyurethane elastomer composition according to claim 1, wherein the average primary particle size of the (C) silicon dioxide is 0.005 to 30 μm.

16. The flame-retardant thermoplastic polyurethane elastomer composition according to claim 1, wherein the average primary particle size of the (C) silicon dioxide is 0.5 to 5 μm.

* * * * *